INVENTOR.
HUGO KLEIN
By
Brown, Murray, Flick + Peckham
Attorneys

INVENTOR.
HUGO KLEIN

# United States Patent Office 3,730,810
Patented May 1, 1973

3,730,810
CORRUGATED PAPERBOARD CUTTING APPARATUS
Hugo Klein, Jesingen, Teck, Germany, assignor to Gebr. Eickhoff, Maschinenfabrik und Eisengiesserei m.b.H., Bochum, Germany
Filed June 15, 1971, Ser. No. 153,213
Int. Cl. B26d 5/20
U.S. Cl. 156—353                    11 Claims

ABSTRACT OF THE DISCLOSURE

After corrugated paperboard is completely prepared by pasting paper facing sheets to opposite sides of an intermediate corrugated sheet, the resulting elongated strip of corrugated paperboard moves out of the pasting machine to cutters where the strip is cut into separate sheets of a length in accordance with the specification of a current production order before the sheets move along a conveyor line to a subsequent work station. Common drive means for the cutters and pasting machine include a planetary gear having a speed adjusting gear for reducing the speed of delivery of paperboard from the pasting machine when necessary such as when a subsequent production order requires different length specifications. Moreover, additional gear means together with a photoelectric cell are provided for sensing suitable marks or optical indicia as printed on one side of the paperboard strip at regular intervals to cooperate with other sensor means such as another photoelectric cell associated with the cutters for sending separate electrical impulses to a servomotor in order to provide a series of sheets of equal length for a given production order.

BACKGROUND OF THE INVENTION

(1) Field of the invention

This invention relates to cutting means for cutting an elongated strip of corrugated paperboard into sheets of equal length.

(2) Description of the prior art

Corrugated paperboard is comprised of an intermediate corrugated paper sheet having flat facing sheets glued to opposite sides thereof. The first facing sheet is applied to one side of the corrugated sheet by any conventional process, and the second facing sheet is glued to the opposite side of the corrugated sheet in a pasting machine in which the two facing sheets are maintained in flat planes. The corrugated paperboard issues from the pasting machine as a continuous strip from where it proceeds on a conveyor line through a series of work stations such as transverse cutters and groovers.

One type of paperboard manufacturing machine is provided with a common motor drive for both the pasting maching and the cutters. In prior practice, the drive mechanism between the motor drive and the pasting machine has included a planetary gear for reducing the speed of movement of a continuous belt by which the corrugated paperboard strip is delivered from the pasting machine. The reduction of speed is usually necessary when a change of production orders occurs in order to make necessary adjustments at subsequent work stations along the conveyor line. For example, a new production order may require cutting the paperboard strip to a different length than the specification of the preceding production order, whereby adjustments are required to cut sheets of lesser or greater lengths than those of the preceding order.

Moreover, during normal operation of the conveyor line where there is no change in a production order, a need frequently arises to adjust deviations of length of consecutive paperboard sheets being cut from the strip issuing from the pasting machine. Dependence upon adjustments in speed of delivery from the pasting machine to the cutter have not always been dependable and have resulted in sheets of unequal length.

SUMMARY OF THE INVENTION

It has been found in accordance with this invention that the foregoing problems may be overcome by providing a device in which with a changeover of production orders the delivery rate of corrugated paperboard strip from a pasting machine may be varied in accordance with the need. With no changeover of production orders, the sheets may be cut from the paperboard strip having a length in accordance with specifications of the current production order by providing means for reducing the speed of operation of the pasting machine as well as providing means for automatically adjusting the length of sequential sheets to the specification requirement. To reduce the delivery rate of the paperboard strip, a braking motor with an associated worm gear is added to the planetary gear whereby slight adjustments during its operation result in greatly reduced transport speed at the delivery end of the pasting machine. In addition, during normal operation of the device, such as where no changeover of orders occurs, deviations of registration from the cut of the cutters are compensated for and equalized by providing a photoelectric cell for reading printed optical indicia or marks on a printed side of the paperboard and transmitting the impulses resulting therefrom to a servomotor which receives corresponding impulses from the cutter and in an attempt to eliminate any time difference in the impulses, the servomotor actuates the worm gear in the planetary gear in the drive to the pasting machine, thereby compensating for any deviations in the length of the sheets.

The advantage of the foregoing construction is the elimination of such factors as mechanical malfunctions and the human element by the provision of automatic means for compensating for any deviations in and between the several work stations in the conveyor line.

BRIEF DESCRIPTION OF THE DRAWINGS

For a better understanding of the invention, reference is made to the accompanying drawings in which.

DESCRIPTION OF THE PREFERRED EMBODIMENT

Figure 1:
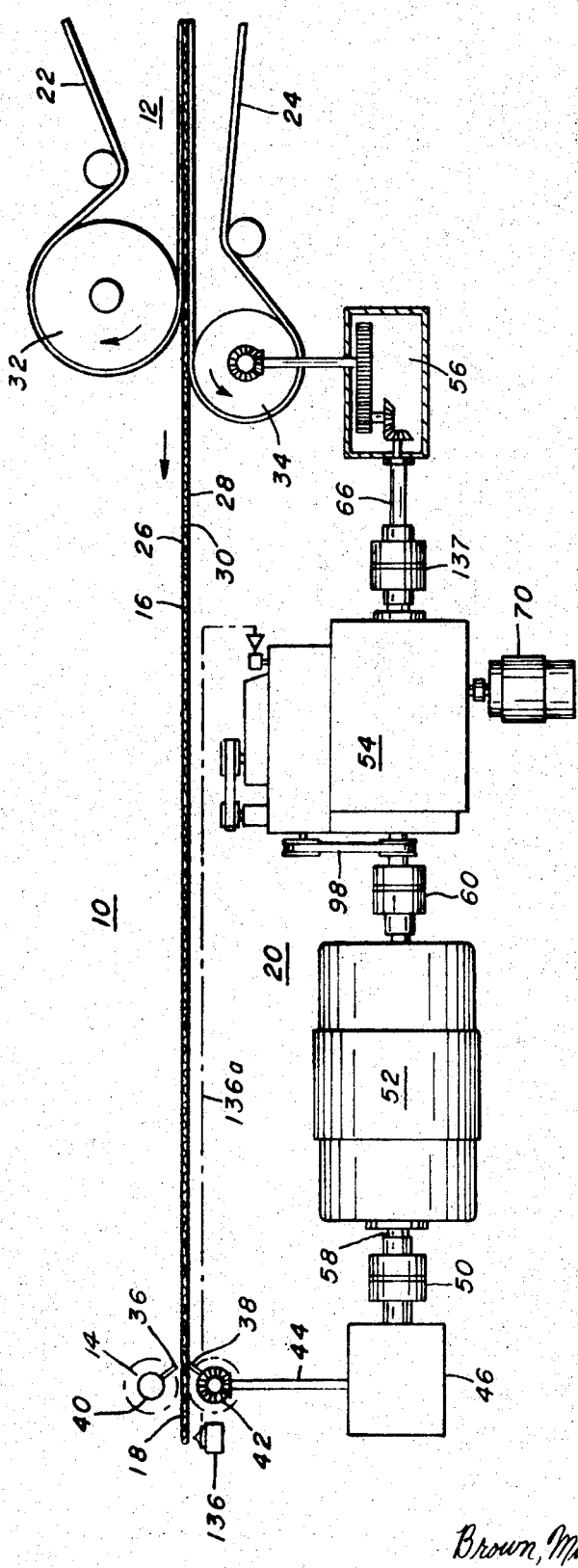
FIG. 1 is a schematic, elevational view of the apparatus showing an elongated strip of corrugated paperboard issuing from the exit end of a pasting machine and extending through the cross cutter, and showing the drive mechanism therefor.

An apparatus for the production of corrugated paperboard is generally indicated at 10 in FIG. 1 and it includes a pasting machine 12, means 14 for cutting a strip 16 of paperboard into separate sheets 18, and means 20 for driving the pasting machine and the cutting means. Although apparatus for the production of corrugated paperboard includes additional devices such as for grooving, cutting, and removing sheets from a conveyor line, only the portions of the apparatus pertinent to this invention are shown in FIG. 1. In fact, only the exit or delivery end of the pasting machine 12 is shown in FIG. 1 and it includes upper and lower continuous belts 22 and 24 which hold the corrugated paperboard strip 16 flat to enable setting and drying of the glue which is used as an adhesive for holding the paperboard 16 together. As shown in the drawings, the paperboard 16 is comprised of upper and lower facing sheets 26 and 28 and an intermediate corrugated paper sheet 30. The belts 22 and 24 extend around corresponding drums 32 and 34 which hold the belts in position on opposite sides of the strip 16.

The cutting means 14 includes a pair of oppositely-disposed cutters or blades 36 and 38 which are mounted on corresponding shafts 40 and 42 which extend horizontally above and below the path of travel of the strip 16. The cutters 36 and 38 rotate simultaneously by drive means including a shaft 44, gear box 46, and a coupling 50. Thus, the cross cutters 36 and 38 cut the strip into sheets 18 at regulated intervals in accordance with specifications of a particular production order. The gear box 46 drives the cutters 36 and 38 continuously and includes a speed reducer that is actuated automatically in a suitable manner after each cutting operation to reduce the rotational speed of the cutters until the moment of cutting recurs and the cutter speed is accelerated.

Figure 3:
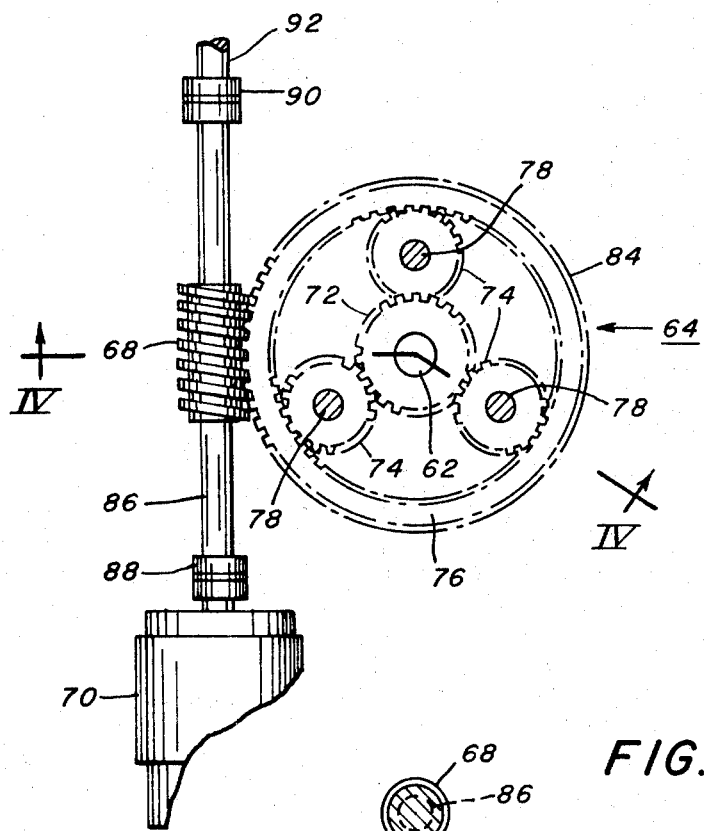
FIG. 3 is a vertical sectional view taken on the line III—III of FIG. 2.
Figure 4:
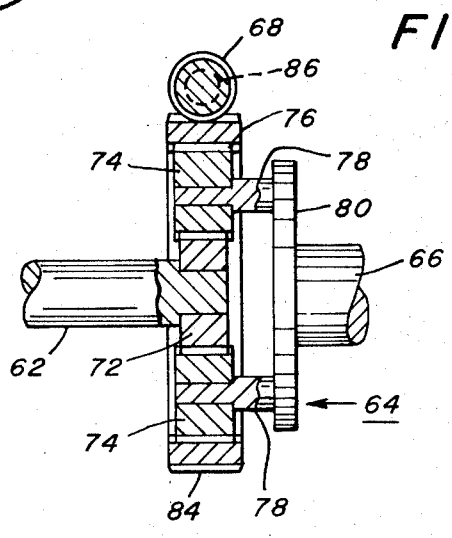
FIG. 4 is a horizontal sectional view taken on the line IV—IV of FIG. 2.

The drive means 20 includes a motor 52, a gear assembly 54, and a speed reducer 56. The motor 52 includes a shaft 58 extending from opposite ends and having a part of the coupling 50 on the left end and the part of another coupling 60 on the right end thereof. As shown more particularly in FIGS. 2 and 3, the gear assembly 54 includes a shaft 62, a planetary gear 64, a driven shaft 66, a worm 68, and a braking motor 70. In FIGS. 3 and 4, the planetary gear 64 includes a sunwheel or gear 72, a plurality of (preferably three) planet wheels 74, and an annulus 76. The sunwheel 72 is fixedly mounted on the right end of the shaft 62 and has peripheral teeth which engage corresponding gear teeth on the planet wheels 74 which are mounted on pins 78 extending from a support plate 80 which is fixedly mounted on the driven shaft 66.

The annulus 76 has inner gear teeth 82 which are engaged by the planet wheels 74 as they rotate around the sunwheel 72 in a conventional manner. In addition, the annulus 76 includes gear teeth 84 on the outer periphery thereof which engage the worm 68 that is mounted on a drive shaft 86. In FIG. 3, a coupling 88 is mounted on the lower end of the shaft 86 to engage or disengage the shaft with the motor 70 by suitable remote control means such as a manual electric switch (not shown in the drawings). Likewise, a coupling 90 is disposed at the upper end of the shaft 86 for engagement and disengagement with a shaft 92 by the same remote control means. The couplings 88 and 90 are actuated alternately and are never operative simultaneously.

Figure 2:
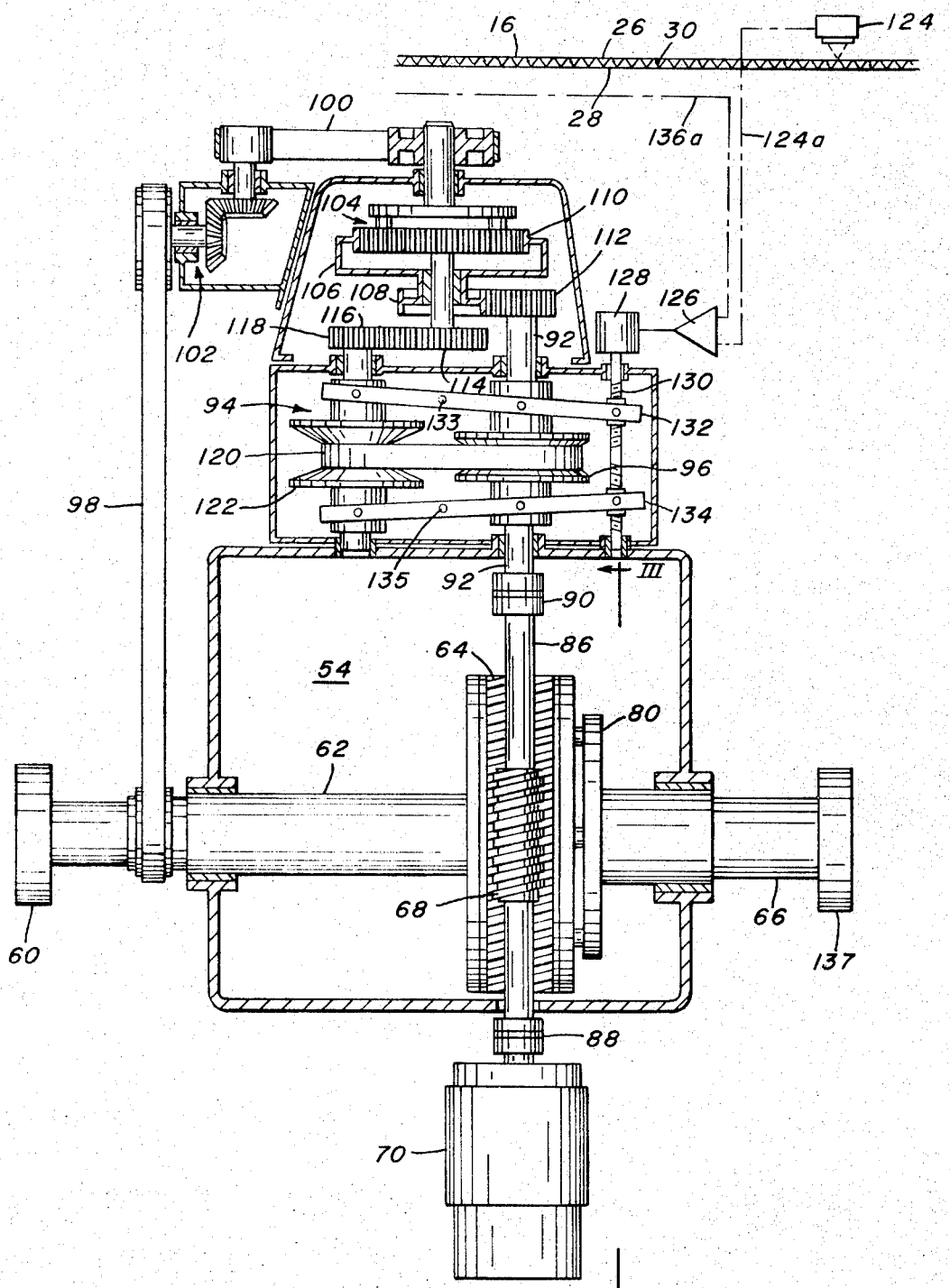
FIG. 2 is an enlarged vertical sectional view through the control gear mechanism for adjusting the speed of operation of the pasting machine.

As shown in FIG. 2, a stepless variable speed transmission generally indicated at 94, is disposed above the gear assembly 54. It provides fine or incremental regulatory adjustments in the planetary gear 64. The primary element of the transmission 944 is a variable-speed sheave 96 which is mounted on the shaft 92. The drive for the shaft 92 may be provided by a separate motor (not shown) which is synchronized with the speed of rotation of the shaft 62, or by an alternate combination of belts and gears including continuous belts 98 and 100 having an interconnecting gear assembly 102 as well as a planetary gear drive which is generally indicated at 104 and which includes an annulus 106 having an external gear 108 and an internal gear 110. Motion is transmitted from the planetary gear 104 to a gear 112 on the upper end of the shaft 92 and to a gear 114 which engages a gear 116 on a shaft 118 which drives a V-belt 120 through a variable-speed sheave 122. The belt 120 operates between the sheaves 96 and 122.

The braking motor 70 is used to quickly reduce the speed of the strip 16 issuing from the pasting machine 12, such as required by a change in a production order for the reasons set forth above. The braking motor 70 operates the annulus 76 in a direction opposite to the direction of rotation of the support plate 80 to reduce the speed of the belts 22 and 24, the former of which is driven through its frictional contact with the latter belt and with the corrugated paperboard strip 16 therebetween. During normal operation when there is no change in production order, the braking motor 70 and the annulus 76 are stationary (with the coupling 90 disengaged) so that the planetary gear 64 serves merely as a reduction gear between the shafts 62 and 66.

During normal operation, however, it may be occasionally necessary to correct certain deviations of the operation of the cutting means 14 from dimensions specified in a particular production order. That is accomplished by a slight change in the speed of travel of the paperboard strip 16 as it travels through the pasting machine 12 relative to the speed of operation of the cutting means 14. Compensation for any deviation in the cutting operation is accomplished through the worm 68 by small rotations thereof to increase or decrease the speed of rotation of the shaft 66. Both plus and minus corrections can be made without reversing the direction of the sheave 96. Moreover, the corrections occur without stopping the operation of the sheave 96.

Both couplings 88 and 90 are operated alternately for selectively connecting the sheave 96 of the braking motor 70 to the shaft 86. Accordingly, when a change in specifications occurs due to a new production order, the gear 96 is disengaged by the coupling 90 by remote control such as a pushbutton and the coupling 88 is engaged for connecting the braking motor 70 with the worm 68.

Under normal operation, the coupling 90 is engaged so that the variable speed transmission 94 is operative to maintain registration between the pasting machine 12 and the cutting means 14. The purpose of the variable speed transmisison 94 is to regulate operation of the cutters 36 and 38 as a function of certain printed marks, optical indicia, or impressions at regular intervals on one of the facing sheets, such as the upper sheet 26, or as a function of the speed of the pasting machine 12. The mechanism for correcting any deviation includes a sensor means or photoelectric cell 124 (FIG. 2), an amplifier 126, and a servomotor 128 which forms a control circuit for making adjustments in the speed of rotation of the sheave 96 which turns with an equidirectional rotary motion with the worm 68.

The photoelectric cell 124 is actuated by the marks such as printed lines or dots (not shown) on the side of the paperboard strip and supplies the amplifier 126 with a sequence of electric impulses 124a generated each time a mark or other indicia passes under the cell. If they are not timed exactly with corresponding impulses from the cutting means 14, the servomotor 128 is actuated to make a corresponding adjustment in the rotational speed of the sheave 96 through a shaft 130 and a pair of levers 132 and 134 having end portions that engage the threaded shaft 130. The levers 132 and 134 are both pivoted to the sheaves 96 and 122 and have fulcrums or pivot pins 133 and 135 in order to simultaneously expand and contract the sheaves to smoothly increase or decrease the rotational speed of the shaft 92. The pivot pins 133 and 135 are secured to an internal portion (not shown) of the housing around the transmission.

Impulses from the cutting means 14 are derived by a suitable sensor 136 associated therewith which detects the precise moment of cutting. The sensor 136 may be a photoelectric cell, as shown in FIG. 1, by which an impulse 136a is transmitted to the amplifier 126. Alternatively, the sensor 136 may be an electromechanical device integral with and operated by the cutters 36 and 38 as they perform the cutting operation.

If the impulses from the cutting means 14 and the photoelectric cell 126 occur simultaneously without a time difference, the servomotor 128 does not operate and therefore makes no adjustment in the sheave 96. However, where a time difference occurs between the impulses, the servomotor 128 operates in one direction or the other (depending upon the order of reception by the amplifier) to make an adjustment in the speed ratio of the sheave, thereby turning the worm 68 and to correct the operation of the cutting means 14. During this regulation process, the sheave 96 slightly reduces or increases the rotational speed of the worm 68 according to the polarity of the control impulses in the servomotor 128. Thus, the rotational speed of the shaft 66 through an engaged coupling 137 is altered slightly so that the time difference of the two electric impulses is gradually reduced and disappears. At the end of the adjustment process, the cutters 36 and 38 are correctly positioned with respect to the marks or indicia on the paperboard strip 16. Accordingly, the impression or indicia has a constant distance from the cut edge of the sheets 18.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an apparatus for the production of sheets of corrugated paperboard from an elongated strip, wherein there is a conveyor line for moving paperboard strip through a sequence of work stations including a paperboard pasting machine having at least one continuous belt for moving the strip through the device and including a rotatable cross cutter downstream of the pasting machine and a motor drive for operating the continuous belt and the cross cutter; the improvement comprising speed control means for said motor drive to adjust the speed of said continuous belt relative to the speed of said cross cutter, said control means including a planetary gear for changing the speed of said continuous belt, said gear having an annulus with outer peripheral gear teeth, a worm engaging said peripheral gear teeth and, drive means for rotating said worm.

2. The apparatus of claim 1 wherein said motor drive includes a rotatable shaft on which the worm is mounted.

3. The apparatus of claim 2 wherein said motor drive includes a braking motor attached to the rotatable shaft.

4. The apparatus of claim 3 wherein a first coupling is provided in the shaft between the braking motor and the worm.

5. The apparatus of claim 4 wherein said motor drive further includes a servomotor operatively attached to the rotatable shaft, a photoelectric cell mounted adjacent to the conveyor line and responsive to any optically sensitive indicia which enables the cell to transmit an electrical pulse to the servomotor.

6. The apparatus of claim 5 wherein a second coupling is provided in the shaft between the servomotor and the worm.

7. The apparatus of claim 2 wherein said motor drive includes a gear assembly for precisely adjusting the speed of rotation of the planetary gear, and means for driving the gear assembly.

8. The apparatus of claim 7 wherein the means for driving the gear assembly includes a variable speed transmission extending between the motor drive and the gear assembly.

9. The apparatus of claim 7 wherein a second coupling is provided in the shaft between the gear assembly and the worm.

10. The apparatus of claim 5 wherein the drive means includes a planetary gear, and a second coupling is provided in the shaft between the worm and said motor drive.

11. The apparatus of claim 5 wherein means for generating an electric impulse is provided in conjunction with each operation of the cross cutters which impulse is received by the servomotor, whereby any time difference between occurrence of the impulses from the cross cutter and from the photoelectric cell result in an adjusting motion of the servomotor for changing the speed of the continuous belt.

References Cited

UNITED STATES PATENTS

| | | | |
|---|---|---|---|
| 3,267,781 | 8/1966 | Sterns et al. | 83—76 X |
| 3,244,863 | 4/1966 | Paterson | 83—76 X |
| 3,084,579 | 4/1963 | Melville | 83—74 |
| 3,608,411 | 9/1971 | Schmidt | 83—76 |
| 3,604,300 | 9/1971 | Allison et al. | 83—76 |

EDWARD G. WHITBY, Primary Examiner

U.S. Cl. X.R.

83—79, 75, 76; 156—462, 510; 198—37